United States Patent
Montague et al.

(10) Patent No.: US 6,723,272 B2
(45) Date of Patent: Apr. 20, 2004

(54) MOULDING PROCESS

(75) Inventors: Keri Jane Montague, Yeovil (GB); Dennis Winston Pugsley, Yeovil (GB)

(73) Assignee: Westland Helicopters Limited, Yeovil (GB)

( * ) Notice: Subject to any disclaimer, the term of this patent is extended or adjusted under 35 U.S.C. 154(b) by 8 days.

(21) Appl. No.: 09/875,252

(22) Filed: Jun. 7, 2001

(65) Prior Publication Data

US 2002/0012591 A1 Jan. 31, 2002

(30) Foreign Application Priority Data

Jun. 10, 2000 (GB) .............................................. 0014113

(51) Int. Cl.⁷ .............................................. B29C 70/44
(52) U.S. Cl. ..................... 264/510; 264/102; 264/257; 264/258; 264/511; 264/571; 156/285; 156/286; 425/389
(58) Field of Search .................. 264/510, 511, 264/571, 102, 257, 258; 425/389, 394; 156/285, 286; 154/245

(56) References Cited

U.S. PATENT DOCUMENTS

| | | | | |
|---|---|---|---|---|
| 3,782,856 A | * | 1/1974 | Salkind et al. ............... | 416/226 |
| 4,842,670 A | * | 6/1989 | Callis et al. ................ | 156/382 |
| 5,123,985 A | | 6/1992 | Evans | |
| 5,348,602 A | * | 9/1994 | Makarenko et al. ......... | 156/161 |
| 5,378,134 A | | 1/1995 | Blot | |
| 5,597,435 A | * | 1/1997 | Desautels et al. ........... | 156/245 |
| 5,716,488 A | * | 2/1998 | Bryant ........................ | 156/382 |
| 5,770,243 A | * | 6/1998 | Butterworth ................. | 425/389 |
| 5,875,732 A | * | 3/1999 | Chapman et al. ........... | 114/357 |
| 5,925,282 A | * | 7/1999 | Rasmussen .................. | 249/55 |
| 5,939,007 A | * | 8/1999 | Iszczyszyn et al. ......... | 264/258 |
| 6,045,651 A | * | 4/2000 | Kline et al. ................. | 156/285 |

FOREIGN PATENT DOCUMENTS

| | | |
|---|---|---|
| DE | 31 45 698 | 5/1998 |
| DE | 198 13 104 | 9/1999 |
| EP | 0 175 510 A2 * | 3/1986 |
| EP | 0 271 263 | 6/1988 |
| FR | 2 629 010 | 9/1989 |
| GB | 599617 | 3/1948 |
| GB | 1 438 184 | 6/1976 |
| GB | 2 073 648 | 10/1981 |
| GB | 2 300 138 | 10/1996 |
| JP | 7-164539 | 6/1995 |
| JP | 8-183088 | 7/1996 |

* cited by examiner

Primary Examiner—Stefan Staicovici
(74) Attorney, Agent, or Firm—Larson & Taylor, PLC

(57) ABSTRACT

A method of moulding articles from layers of composite material being fibres impregnated with uncured resin, includes draping at least one layer of the composite material over a moulding tool, applying over the composite material layer or layers a membrane, and establishing an at least partial vacuum between the membrane and the moulding tool to consolidate the composite material, and wherein the membrane is made of a resilient material, and the method includes applying a force to the membrane to stretch the membrane over the moulding tool and maintaining the force whilst the at least partial vacuum is established.

8 Claims, 3 Drawing Sheets

MOULDING PROCESS

BACKGROUND OF THE INVENTION

This invention relates to a method of moulding and to a moulding apparatus. More particularly but not exclusively the invention relates to a method of moulding a large article where tolerances are critical, such as a helicopter rotor blade which is elongate, having a substantial axial extent, or a component therefore, such as a leading edge spar.

DESCRIPTION OF THE PRIOR ART

It is known to manufacture helicopter rotor blades by draping one or usually more than one, layer of composite material in or over a male moulding tool. The composite material may typically be fibres such as carbon, glass or Kevlar fibres impregnated with an uncured resin, usually a thermosetting resin.

A membrane is then placed over the composite layers and an at least partial vacuum established between the membrane and moulding tool, to consolidate the composite material.

The method may be repeated during laying up of the layers, to consolidate and remove any air trapped between layers of the composite material. Finally, with a membrane in place, and at least partial vacuum established, the moulding tool and draped composite material are subjected to heat and pressure, typically within an autoclave, to cause or promote curing of the resin, whilst the pressure ensures consolidation of the composite material on or in the male moulding tool.

The membranes used are made in bagging materials which have only limited stretch and are unable to form to complex shapes. To overcome this problem, the membrane material may be pleated, but this can cause a pinch into which composite material may deform, which spoils the shape of the finally moulded article, and in the case of a helicopter blade, this can result in the scrapping of the moulded article.

Also, it is known to use a so-called shape intensifier, which typically, where the moulding tool is a generally male shape, is a matching female shape. The male and female shapes are relatively closed together thus preventing any thickness variations in the composite material between the shapes thus providing a definitive shape for the composite. However, particularly where the article to be moulded is a large elongate article with a substantial axial extent, such as a helicopter blade, to make a matching pair of moulding tools for the whole article can be prohibitively expensive. Accordingly it is usual for one or more shape intensifiers to be provided which are of relatively small extent compared to the main moulding tool, and are used in particularly problematical areas of the article only.

Another problem with the known method described above of moulding using bagging materials, is that by the nature of the bagging materials, generally they are usable only once, and have to be disposed of after a single use. This is because the bagging material degrades and becomes brittle due to the heat experienced in curing of the composite material, thus becoming sub-standard and a risk to re-use.

In GB 1438184 there is disclosed a method of moulding in which a rubber band is used to hold layers of composite material on a moulding tool whilst the tool and composite material layers are introduced into an elastic bag.

The moulding tool, composite material layers and the elastic bag are then placed in an autoclave where compression of the material layers is achieved by applying a vacuum.

SUMMARY OF THE INVENTION

According to a first aspect of the invention we provide a method of moulding articles from layers of composite material being fibres impregnated with uncured resin, the method including draping at least one layer of the composite material over a moulding tool, applying over the composite material layer or layers, a membrane, and establishing an at least partial vacuum between the membrane and the moulding tool to consolidate the composite material, characterised in that the membrane is made of a resilient material, and the method includes applying a force to the membrane to stretch the membrane over the moulding tool and maintaining the force whilst the at least partial vacuum is established.

Thus in accordance with the present invention, the membrane will conform to the shape of the moulding tool by stretching so that no pleating or the like is required to accommodate complex moulding tool shapes prior to any compression of the material layer or layers in an autoclave or the like. Furthermore, by using suitable resilient membrane materials, such as elastomeric materials, the membrane may repeatedly be re-used. Moreover, it has been found that the stretched elastomeric material acts as a shape intensifier, thus avoiding the need to provide a shape intensifier made specifically to match areas of the moulding tool.

The invention may be applied for consolidating and de-baulking individual layers, or a plurality of individual layers prior to the resin being subjected to heat or otherwise cured. However the method of the invention may include applying heat to the composite material with the membrane in a stretched condition and with the at least partial vacuum established, causing or promote curing of the resin. Thus the resin preferably is a thermosetting resin. The invention may include placing the moulding tool, uncured composite material, and stretched membrane in an autoclave in which the composite material is subjected to heat and desirably, pressure too.

According to a second aspect of the invention we provide a moulding apparatus for moulding articles from layers of composite material being fibres impregnated with uncured resin, the moulding apparatus including a moulding tool and a frame affording an opening, the opening having therein a membrane of resilient material, there being means to move the frame from one position in which the membrane is spaced from the moulding tool, to another position in which the membrane is stretched over the moulding tool with at least one layer of composite material between the moulding tool and the membrane, with there being means to maintain the membrane in a stretched condition whilst an at least partial vacuum is established between the membrane and the moulding tool.

The apparatus may further include means to apply heat to the composite material whilst the membrane is in the stretched condition and the at least partial vacuum is applied to cure or promote curing of the resin of the composite material.

The apparatus may include a base on or in which the moulding tool is provided, with there being means to provide a substantially air-tight seal between the frame and the base when the frame is in its second condition to enable the at least partial vacuum to be established between the membrane and the moulding tool.

BRIEF DESCRIPTION OF THE DRAWINGS

The invention will now be described with reference to the accompanying drawings in which.

DESCRIPTION OF THE PREFERRED EMBODIMENTS

Figure 1:
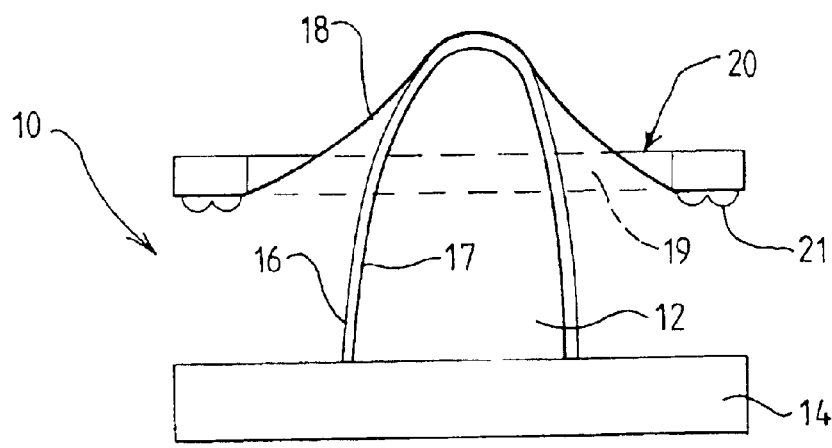
FIG. 1 is an illustrative end view of a moulding apparatus according to the second aspect of the invention, in a first stage of a moulding method according to the first aspect of the invention.

Referring to the drawings, a moulding apparatus 10 includes a male moulding tool 12 which in this example, is for moulding in a composite material, a leading edge spar of a rotor blade for a helicopter which is elongate having a substantial axial extent. Thus the moulding tool 12 is of a configuration closely resembling the desired configuration of the leading edge spar of the rotor blade, and extends for the entire length of the spar to be moulded. Thus the moulding tool 12 is of a substantial lengthways extent.

The moulding tool 12 is provided on a base 14 which may be an integral part of the tool 12, or the moulding tool 12 may be mounted with respect to the base 14. As is conventional, the tool 12 has draped over it, one or more layers 16 of composite material. Such composite material layers may typically include fibres such as carbon, glass or Kevlar fibres impregnated with an uncured resin, usually a thermosetting resin. In the drawings these layers 16 are denoted by a single line 17.

In order to consolidate the individual layers 16, or a plurality of the layers, and to remove air between the layers, a membrane 18 is placed over the moulding tool 12 and composite layer or layers 16. An at least partial vacuum is then established between the membrane 18 and the base 14.

In accordance with the invention, the membrane 18 is made of elastomeric material and is applied to at least a substantial part of the axial extent of the moulding tool 12, and desirably, over the entire axial extend of the moulding tool 12. The membrane 18 is carried by and occupies an opening 19 afforded by a frame 20 which extends for the full extent of and surrounds the moulding tool 12 for the spar to be moulded. The frame 20 carries around the periphery thereof, a seal 21. It can be seen that the resilient membrane 18 in FIG. 1, is in a relaxed condition and thus the resilient material when in this condition is of greater extent than the opening 19 of the frame 20.

Figure 2:
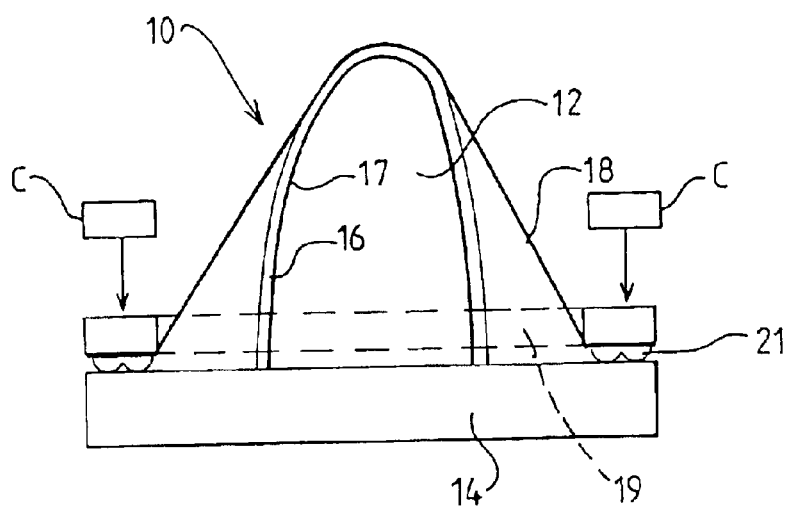
FIG. 2 is view similar to FIG. 1 but at a second moulding stage.

In FIG. 2, it can be seen that the frame 20 has been moved towards the base 14. This will require a sufficient force to be exerted to stretch the elastomeric material membrane 18 over the laid-up moulding tool 12. In this condition, the seal 21 is in substantially air tight sealing contact with the base 14. Most conveniently the membrane 18 is maintained in the stretched condition by applying a clamp C between the frame 20 and the base 14.

The stretched elastomeric membrane 18 will act to consolidate the layer or layers of composite material 16 about the generally male configuration moulding tool 12. An at least partial vacuum is then established between the membrane 18 and the base 14, to remove air particularly from between layers of the composite material 16. The elastomeric membrane 18 will thus assume the condition indicated in FIG. 3 in which the membrane 18 will be further stretched around, thus to conform to the shape of the moulding tool 12.

The method described thus far may be applied each time a layer is, or a plurality of layers 16 are draped over the moulding tool 12, to consolidate the layers, during laying-up. In between the individual layer or layers being applied, the vacuum may be released and the membrane 18 moved away from the moulding tool 12 sufficiently to allow the next layer or layers or un-cured pre-impregnated composite material to be applied.

Figure 3:
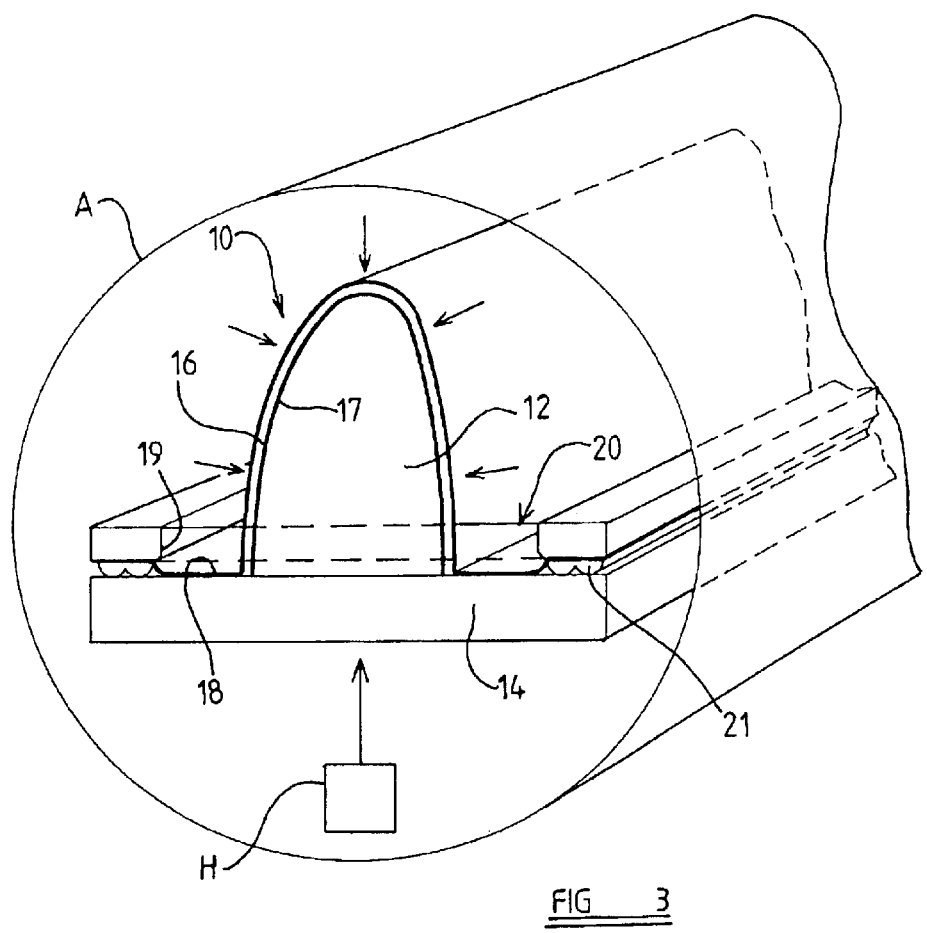
FIG. 3 is a view similar to FIGS. 1 and 2 in perspective, but at a third moulding stage.

When the final layer has been laid-up, the moulding tool 12 together with stretched membrane 18 may be placed in an autoclave A (with the at least partially applied vacuum applied, as indicated in FIG. 3), whereby the resin may be subjected to heat from a heating means H to cure or at least partially cure the resin. Within the autoclave, if desired, the pressure exterior to the membrane 18 may be increased.

Various modifications may be made without departing from the scope of the invention. For example, the method and apparatus described may be used for moulding in composite material, articles other than spars of helicopter rotor blades, in which case the moulding tool 12 and frame 20 may be configured particularly for the article to be moulded.

The invention is particularly useful where the composite material to be cured is thick, by which we mean having a thickness of greater than 1.5 mm but may be applied where the composite material is to be thicker/thinner than this range.

An example of a suitable elastomeric membrane material is silicon rubber which is able to withstand temperatures typically encountered during heat curing of thermosetting resins, namely of up to about 175° C., and resiliently return to its original shape, for re-use. However, any other elastomeric material, such as natural or another artificial rubber, may be used.

Figure 4:
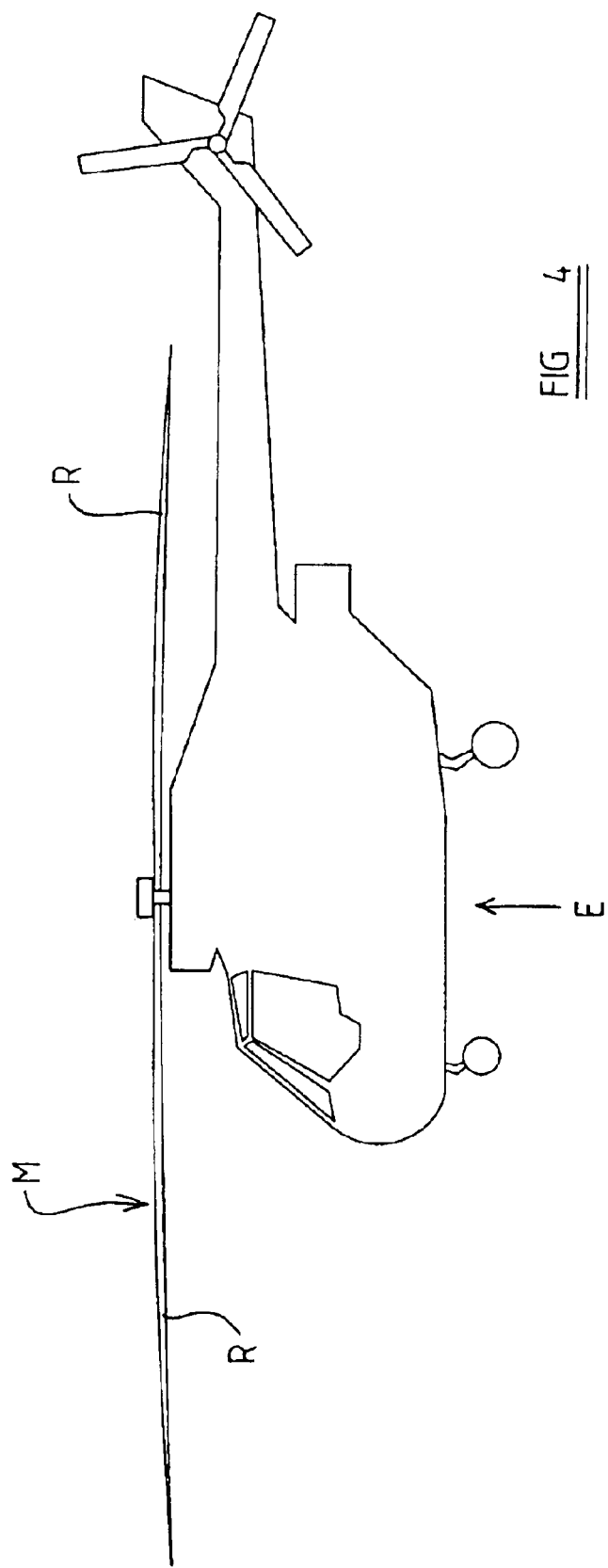
FIG. 4 is an illustrative side view of a helicopter having a main sustaining rotor, the leading edge spars of the blades of which are made by the method of the invention.

In FIG. 4 there is shown a helicopter E having a main sustaining rotor M with a plurality of rotor blades R, at least the leading edge spars of which are each made by the method described above, using the moulding apparatus 10.

Whereas desirably the entire leading edge spar component, or other component of each rotor blade R is made in a single laying up process, using one membrane 18 applied to the entire length of the elongate moulding tool 12, the leading edge spars or other components of the rotor blades R may be made in sections which are subsequently assembled together to make a rotor blade R.

What is claimed is:

1. A method of moulding articles from layers of composite material comprising fibres impregnated with uncured resin, using a moulding apparatus including a male moulding tool, and a frame affording an opening, and the opening having therein a membrane of resilient material, the method including draping at least one layer of the composite material over the moulding tool, applying the membrane over the at least one layer of composite material, and establishing an at least partial vacuum between the membrane and the moulding tool to consolidate the composite material, the method further including, prior to applying the at least partial vacuum, positioning the frame in a first position in which portions of the frame are disposed on opposite sides of the moulding tool and the membrane is disposed in an unstretched condition on the moulding tool, moving the frame from the first position, in a direction towards the tool, to a second position wherein said portions of the frame disposed on opposite sides of the moulding tool are spaced along the moulding tool from said first position and the membrane is stretched over the moulding tool during movement of the frame between said first and second positions, and wherein a stretching force is applied to the membrane in the second position of said frame such as to provide stretching of the membrane over the moulding tool sufficient to consolidate the at least one layer of composite material, and maintaining the frame in the second position to maintain the force on the at least one layer whilst the at least partial vacuum is established, the method further including applying heat to the composite material with the membrane in a stretched condition and with the at least partial vacuum established, to cause or promote curing of the uncured resin, the resin being a thermosetting resin, and the method further including placing the moulding tool, uncured composite material, and stretched membrane in an autoclave in which the composite material is subjected to heat.

2. A method according to claim 1 wherein the resilient membrane material is an elastomeric material.

3. A method according to claim 2 wherein the method includes re-using the membrane material to consolidate further layers of composite material.

4. A method according to claim 1 wherein the method includes consolidating and de-baulking individual composite materials prior to the resin being cured.

5. A method according to claim 1 wherein the method includes consolidating and de-baulking a plurality of individual layers of the composite material prior the resin being cured.

6. A method according to claim 1 wherein in the autoclave, the moulding tool, uncured composite material, and stretched membrane are subjected to pressure.

7. A method according to claim 1 wherein the article is elongate and the membrane is applied over at least a substantial part of the axial extent of the article.

8. A method according to claim 7 wherein the article is a leading edge spar of a helicopter rotor blade.

* * * * *